United States Patent [19]
Bochot et al.

[11] Patent Number: 5,759,105
[45] Date of Patent: Jun. 2, 1998

[54] DOUBLE DAMPED FLYWHEEL HAVING FRICTION DEVICE FOR EASE OF ASSEMBLY AND CALIBRATION, ESPECIALLY FOR MOTOR VEHICLES

[75] Inventors: Jean-Claude Bochot, Claye-Souilly; Philippe Lucienne, Aumont; Christophe Tardiveau, Paris; Serge Scampucci, Crepy en Valois, all of France

[73] Assignee: VALEO, Paris, Cedex, France

[21] Appl. No.: 263,743

[22] Filed: Jun. 22, 1994

[30] Foreign Application Priority Data

Jun. 25, 1993 [FR] France .................. 93 07750

[51] Int. Cl.$^6$ .................. F16D 3/14; F16F 15/12
[52] U.S. Cl. .................. 464/68; 192/214
[58] Field of Search .................. 464/66, 68; 192/106.2, 192/214; 74/574

[56] References Cited

U.S. PATENT DOCUMENTS

| | | | |
|---|---|---|---|
| 4,036,341 | 7/1977 | Beeskow et al. | 192/106.2 |
| 4,433,771 | 2/1984 | Caray | 192/106.2 |
| 4,687,087 | 8/1987 | Tebbe | 192/106.2 |
| 4,848,551 | 7/1989 | Caspar | 192/106.2 |
| 5,059,155 | 10/1991 | Tojima | 464/68 |
| 5,083,981 | 1/1992 | Forster | 464/68 |

FOREIGN PATENT DOCUMENTS

| | | |
|---|---|---|
| 0212041 | 3/1987 | European Pat. Off. . |
| 2195299 | 3/1974 | France . |
| 2609132 | 7/1988 | France . |
| 2687442 | 8/1993 | France .................. 74/574 |
| 2430160 | 2/1975 | Germany . |
| 3546503 | 4/1987 | Germany . |
| 57-149625 | 9/1982 | Japan . |
| 2160296 | 12/1985 | United Kingdom . |

OTHER PUBLICATIONS

"Clutch Disc", *Patnt Abstracts of Japan*, vol. 7 No. 59 (M-199), p. 1204, 11 Mar. 1993.

*Primary Examiner*—Daniel P. Stodola
*Assistant Examiner*—Emmanuel M. Marcelo
*Attorney, Agent, or Firm*—Longacre & White

[57] ABSTRACT

A double damped flywheel for a motor vehicle comprises a first mass having a central hub, a second mass, a torsion damper, and a friction device working axially between the first mass and the second mass and having at least one friction ring in contact with a friction surface. The friction ring and the associated friction surface are carried by a support cage which is fitted on a local portion, having an increased radius, of the central hub, this cage being located axially by a transverse thrust plate of the first mass, so that the cage is located between this thrust plate and the anti-friction bearing by which the second mass is mounted on the first mass.

6 Claims, 4 Drawing Sheets

5,759,105

1

DOUBLE DAMPED FLYWHEEL HAVING FRICTION DEVICE FOR EASE OF ASSEMBLY AND CALIBRATION, ESPECIALLY FOR MOTOR VEHICLES

FIELD OF THE INVENTION

The present invention relates to a double damped flywheel, especially for a motor vehicle, of the kind comprising a first mass having a central hub, a second mass comprising a plate member which carries internally thereof an outer hub which partly surrounds the central hub, with anti-friction bearing means being interposed between the central hub and the outer hub, a circumferentially acting torsion damper coupling the first mass to the plate member of the second mass and having a friction means which works axially between the first mass and the second mass, and in which the friction means comprises, firstly, at least one friction ring mounted in rotation on one of the said masses, optionally with a circumferential clearance between them, and secondly, axially acting resilient means for acting on the said friction means and for urging the latter into contact with a friction surface which is part of a friction member, this friction member being mounted in rotation, optionally with a circumferential clearance between them, on the other one of the two said masses.

BACKGROUND OF THE INVENTION

A double flywheel of the above kind is described in United Kingdom patent specification GB 2 160 296A. In that document, the torsion damper includes a disc which extends radially inwardly at the level of the outer hub, so as to offer an engagement surface to a Belleville ring which is part of the friction means, while a radial plate member of the first mass constitutes the friction member.

This disc is secured to the plate member of the second mass by means of spacing bar elements. These bar elements act to drive a thrust ring in rotation, without any clearance, into contact with the friction ring, providing an abutment for the axially acting resilient means. As a result, the friction means biasses the disc, and during assembly of the torsion damper, it is necessary to stack the components of the friction means together and to compress its axially acting resilient means. This method of assembly is not easy to carry out, and the calibration of the said resilient means cannot be accurately controlled.

In addition, there is a danger that the components can become damaged during assembly; besides this, it is not possible to carry out a proper lapping or bedding-in operation on the friction means in advance. It is desirable to do so, in order to produce the required coefficient of friction. In this connection, when the friction ring is new, it develops an encrusted surface which must be removed in order to give the required coefficient of friction. Finally, it is necessary to machine the plate member of the first mass which carries the friction surface.

DISCUSSION OF THE INVENTION

An object of the invention is to overcome these drawbacks in a simple and inexpensive way, and accordingly to provide a novel arrangement which permits easy assembly of the friction means within the double damped flywheel, while also enabling the calibration of the friction ring to be properly controlled, and permitting advance bedding-in of the friction means, while in addition, simplifying the machining operations involved in manufacture of the flywheel.

2

According to the invention, a double flywheel incorporating a torsion damper and comprising a first mass having a central hub, a second mass which includes a plate member carrying internally thereof an outer hub which partly surrounds the central hub, with anti-friction bearing means being interposed between the central hub and the outer hub, and with the said torsion damper, for circumferential action, coupling the first mass to the said plate member of the second mass, the torsion damper having a friction means working axially between the first mass and the second mass, the said friction means comprising, firstly, at least one friction ring which is mounted on the said second mass for rotation with the latter, with an optional circumferential clearance between them, and secondly, axially acting resilient means for working on the said friction ring so as to urge the latter into contact with a friction surface which is part of a friction member, the said friction member being mounted on the first mass, optionally with a circumferential clearance between them, is characterised in that the said friction means is a unit which can be handled and transported by itself, in which the said friction ring and the said friction surface are carried by a support cage having an axial abutment element for engagement with the axially acting resilient means, in that the said support cage is fitted on a local portion of the central hub, said local portion being of increased radius, the support cage being located axially thereon by a transverse thrust plate which is part of the said first mass, whereby the said support cage is mounted axially between the said thrust plate and the anti-friction bearing means.

The invention enables the friction means to be made in a first manufacturing location, and to be fitted subsequently into the double flywheel in some other location. During final assembly, the down-time of the machines concerned is reduced, and it is not possible for any component to escape or be damaged, due to the construction of the friction cassette, which is fitted by simply threading it on to the central hub. There is no need to compress the axially acting resilient means during final fitting.

In addition, during manufacture of the cassette, it is possible to provide good control of the gripping force exerted by the friction ring by means of the resilient means, with the axial abutment element providing a shoulder for the resilient means.

The cassette which is provided by the invention makes it possible to bed in, or lap, the friction ring to the associated friction surface in advance, using a suitable machine. The friction means can be properly set before being subsequently fitted.

All of the above reduces the number of rejects, and improves quality generally. Furthermore, the cassette can readily be removed.

It will be appreciated that the double damped flywheel is both simplified and optimised. In addition, the number of components which it is necessary to keep in stock for the final operation is reduced, and there is no danger of the wrong friction ring being fitted, for example. The danger of errors in manufacture are thus reduced. The friction surface is not interrupted, due to the presence of the support cage, and the thrust plate does not require to be machined, because it is the support cage itself that constitutes the friction member engaged by the friction ring.

The resilient means (such as a Belleville ring) do not exert any force on the associated part of the friction ring. The resilient means bear directly on the axial abutment element, or indirectly on it through a thrust ring which is then interposed axially between the resilient means and the abutment element. The distance between the axial abutment element and the friction surface enables the load exerted by the resilient means to be precisely controlled.

The friction ring is preferably extended at its outer periphery in order to define slots, fingers or the like, which mesh (with a clearance) with projections or slots which are part of the associated mass of the flywheel concerned. This arrangement is very inexpensive, and the said extension preferably defines a local portion of increased thickness, which simplifies the form of the ring and enlarges the surfaces for contact with the projections.

In addition, the friction surface of the ring is enlarged due to the extension of the latter, while the resilient means of the friction cassette are able to work centrally on the friction ring.

The friction ring may be arranged to close a sealed cavity at the level of the thrust plate.

The torsion damper may include an annular damper plate of L-shaped cross section penetrating into a cavity which is delimited by a housing defined by that one of the masses of the flywheel that includes the thrust plate.

It will be appreciated that it is possible easily to mount a plurality of friction rings within the cassette, in order to increase the friction torque. It is also possible to fit more than one resilient means in the cassette.

The friction ring may take a large number of forms, and the support cage may be in one or more parts. This cage may be mounted directly in rotation, optionally with a circumferential clearance, on the first mass of the flywheel. In another version, the support cage may be mounted on the first mass through thrust rings which act as engagement elements for the axially acting resilient means, meshing, for example, again optionally with a circumferential clearance, with the local portion, of increased radius, of the central hub.

The support cage may be force-fitted on the central hub, which simplifies the machining of the latter. In all cases, there is no need to secure the support cage to the first mass, for example by riveting. The resilient means carried by the support cage may mesh with the latter, and more precisely with a generally comb-shaped sleeve portion of the latter, so as to prevent them from rotating and to reduce noise and/or wear.

Further features and advantages of the invention will appear more clearly on a reading of the detailed description of preferred embodiments of the invention which is given below, by way of example only and with reference to the accompanying drawings.

DESCRIPTION OF PREFERRED EMBODIMENTS OF THE INVENTION

Figure 1:
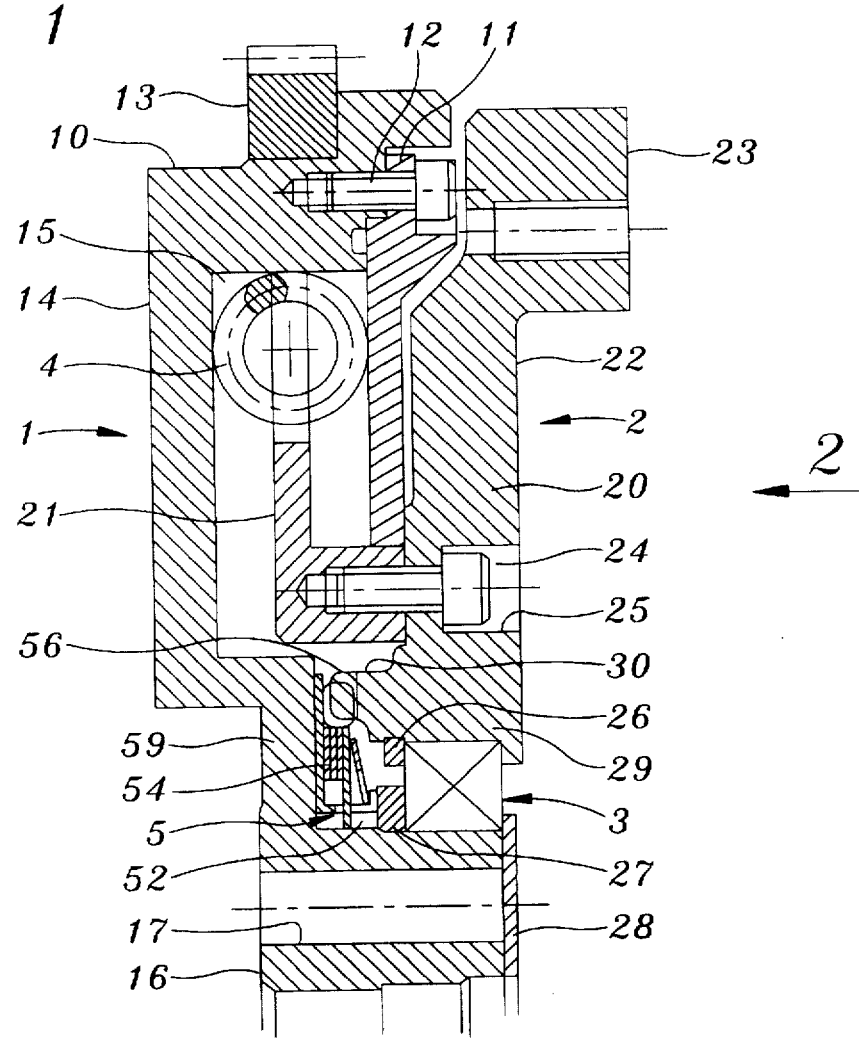
FIG. 1 is a half view in axial cross section of the double damped flywheel in accordance with the present invention.

The drawings show a double flywheel incorporating a torsion damper (referred to herein as a double damped flywheel), comprising two coaxial masses 1 and 2, which are mounted for movement with respect to each other against the action of circumferentially acting resilient means 4 and axially acting friction means 5. This double flywheel is intended for use in a motor vehicle.

The first mass 1 includes a central hub 16, while the second mass 2 comprises a secondary flywheel 20 which carries at its radially inner periphery an outer hub 29 which partly surrounds the central hub 16 of the first mass. A circumferentially acting torsion damper 4, 41, 32, 31, 21 couples the first mass 1 to the secondary flywheel 20 of the second mass 2. This torsion damper comprises firstly a fastening portion 21 which is secured by fastening means 24 to the secondary flywheel 20, and secondly the friction means 5 which work axially between the first mass 1 and the second mass 2.

The friction means 5 (see FIG. 5) comprise a friction ring 54 which is in frictional contact with a friction surface 6. In general terms, this friction surface 6 is coupled in rotation with the first mass 1 in a manner described below, and this coupling may be in the form of a loose coupling, i.e. one which defines a circumferential clearance that has to be taken up before the two halves of the coupling can rotate together.

Referring to FIG. 1, the second mass 2 of this double flywheel is mounted for rotation on the first mass 1, through anti-friction bearing means 3 interposed radially between the central hub 16 and the outer hub 29. In addition, the friction means 5 surrounds the central hub 16, and also includes a thrust ring 53 which is acted on by an axially acting resilient means 51 so as to grip the friction ring 54 between the thrust ring 53 and the friction surface 6.

The friction ring 54 is so configured at its outer periphery as to mesh, with a circumferential clearance, with axial projections 56. The axial projections 56 are fixed with respect to the outer hub 29, and are separate from the fastening means 24 which fasten the torsion damper to the secondary flywheel 20. The torsion damper, with its fastening means 24, extends radially outwardly with respect to the axial projections 56.

The axially acting resilient means 51 bear on a shoulder, described below, which is carried by the central hub 16, in order for the resilient means 51 to act on the thrust ring 53.

The first mass 1 of the double flywheel comprises generally annular elements, namely a main flywheel 14 which is generally radial and which is of metal. The main flywheel 14 carries an axially oriented flange 10 at its outer periphery, and with its flange 10 it constitutes a hollow housing member. A cover plate 11 and the central hub 16 together define a sealed hollow housing. The cover member 11 is carried by the outer flange 10, so that the interior of this housing consists of a sealed annular cavity 15 which is filled partly with grease. For this purpose the cover plate 11 is secured sealingly on the flange 10, in this example by means of studs 12, and a sealing ring can be seen in solid shading in FIG. 1 between these two components. The flange 10 carries a toothed crown 13, secured around its outer periphery, which is arranged to be driven by the starter of the vehicle.

It can be seen from FIG. 1 that the central hub 16 is fixed with respect to the main flywheel 14, and forms the radially inner base of the housing. The central hub 16 projects axially from the main radial portion of the flywheel 14, and in this example it is integral with the latter. This component is preferably in the form of a casting.

The first mass 1 of the flywheel, comprising the main flywheel, the cover plate 11 and the starter crown 13, is mounted on the crankshaft of the internal combustion engine of the motor vehicle, for rotation with it, being secured to the crankshaft by means of screws (not shown), which extend through axial holes 17 formed in the central hub 16.

The second mass 2 is coupled with the input shaft of the gearbox of the vehicle, through the friction clutch of the vehicle. To this end, the secondary flywheel 20 is so designed that it constitutes the reaction plate of the clutch. In the usual way, the clutch has a friction disc which makes frictional contact with the reaction plate 20 when the clutch is engaged, the friction disc being itself mounted on the gearbox input shaft for rotation with the latter. For greater detail, reference is invited to United Kingdom published patent specification GB 2 160 296A. Here, the friction face of the reaction plate 20, which in this example is a casting, carries the reference numeral 22, while the fastening face of the cover plate of the clutch carries the reference numeral 23.

The component 21 (referred to above as a "fastening portion") of the second mass 2 is an annular damper plate 21, which in this example is of metal. The damper plate 21 is coupled to the reaction plate 20 for rotation with the latter, and lies in the cavity 15, being located axially between the main radial portion of the main flywheel 14 and the cover plate 11 of the first mass. The damper plate 21 is part of the torsion damper, and in this example it has an L-shaped cross section defining a central tubular fastening portion secured to the secondary flywheel or reaction plate 20 by means of the fastening means 24 (which in this example consist of a series of studs). The inner periphery of the cover plate 11 is adjacent to this central tubular fastening portion of the damper plate 21, which it surrounds so as to define a narrow annular passage between these two components. This passage is narrow enough to prevent the escape of grease from the cavity 15.

Figure 2:
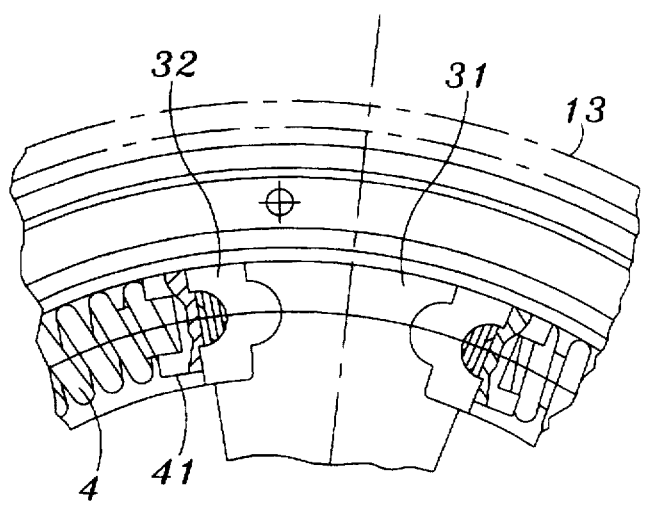
FIG. 2 is a scrap view as seen in the direction of the arrow 2 in FIG. 1, with the cover plate and the secondary flywheel omitted.

The damper plate 21 has radial arms 31, shown in FIG. 2. These arms 31 interfere between and engage on the circumferentially acting resilient means 4 which are part of the torsion damper and which couple the first mass 1 to the second mass 2. In this example the resilient means 4 consist of a plurality of coil springs of substantial length, bearing on thrust inserts 32. These thrust inserts are arranged in facing pairs and are secured to the cover plate 11 and flywheel 14, for example by riveting or welding. The thrust inserts 32 are also part of the torsion damper, as are the arms 31 of the damper plate. The inserts 32 are slotted for cooperation with further insert pieces 41 in which the ends of the springs 4 are seated. In the present example, the springs 4 are fitted without any clearance between the thrust inserts 32, but with a clearance with respect to the radial arms 31. However, the springs 4 can of course be fitted without any clearance with respect to the arms 31, according to the particular application. It can be seen from the drawings that the springs 4 lie at the inner periphery of the flange 10, and it will be understood that they are lubricated by the grease in the cavity 15, which extends their useful life.

Reverting to the friction means 5, in this example the axially acting resilient means 51 (FIGS. 1 and 5) consist of a Belleville ring which has a central portion divided into radial fingers. In a modification, this may be replaced by an axially acting corrugated ring, or by two Belleville rings as described later herein.

Figure 4:
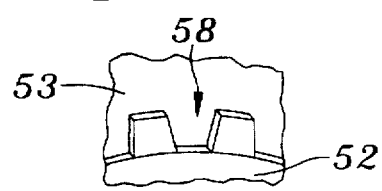
FIG. 4 is a scrap view showing the mating cooperation between the thrust ring and the central hub.
Figure 3:
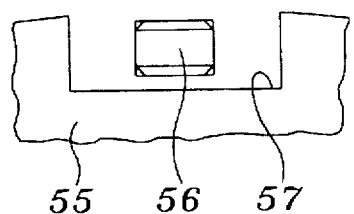
FIG. 3 is a scrap view showing the loose coupling between the friction ring and the axial projections.

The thrust ring 53, of reduced size, is coupled in rotation to the central hub 16 through a mating coupling 58 (see FIG. 4). In this example this coupling is of the splined type, and the central hub 16 has in its inner periphery a local portion 52 of increased radius defining trapezoidal teeth, while the thrust ring 53 has at its inner periphery complementary slots for cooperating with the teeth and vice versa, so that the teeth of one of the components 52, 53 mesh with the slots of the other component 53 or 52. In a modification, the local portion 52 of increased radius may be formed with external flats, with complementary flats being formed in the bore of the thrust ring 53.

The friction ring 54 is inserted axially between the thrust ring 53 and the friction surface 6 of the mass 1 of the double flywheel. The friction means 5 surrounds the central hub 16, on the free end of which the anti-friction bearing means 3 are fitted. In this example this latter consists of a ball bearing having one ball race. In a modification, the bearing means 3 may consist of a rolling bearing having two ball races, as described in United Kingdom patent specification GB 2 160 296A. Again, it may consist of a plain bearing of anti-friction material.

The bearing 3 is interposed radially between the central hub 16 and the outer hub 29, which is fixed with respect to the reaction plate 20; in this example it is integral with the latter. The outer hub 29, which is at the inner periphery of the reaction plate 20, is shouldered at the level of the friction face 22, so as to engage with the outer ring of the rolling bearing, which is engaged in the internal bore of the outer hub 29, and which is located axially on the latter by this shoulder and also by a locating ring 26 such as a circlip. This circlip is located axially on the internal periphery of the outer hub 29, by means of a shoulder formed on the latter as can be seen in FIG. 1. The bearing 3 is located axially on the central hub 16, firstly through an end ring 28 which also serves as a thrust member for the heads of the fastening screws (not shown), mentioned earlier, whereby the central hub 16 is secured to the crankshaft of the engine, and secondly, through a further locating ring 27 which is located axially on a radial shoulder defined by the corresponding free end of the local portion 52 of the central hub.

The second mass 2 is thus located axially on the first mass 1, so as to be coaxial with the latter and rotatable with respect to the first mass 1 through the anti-friction bearing means 3.

The second locating ring 27 defines a shoulder carried by the central hub 16. The friction ring 54 is so configured as to mesh (in this example with a clearance) with the axial projections 56 of the outer hub 29. These projections 56 may consist of spigots carried on the outer hub 29, but in the present example the projections 56 are integral with the hub 29 and are of rectangular cross section.

The friction ring 54 carries at its outer periphery 55, in this example, outwardly open slots 57 in which the projections 56 are engaged with a clearance. The slots 57 may be part of a member fixed to the friction ring 54, for example by being moulded on to it; but in this example, and preferably, the friction ring 54 is of monobloc form. It is mounted for free rotation with respect to the thrust ring 53 and to the friction surface 6 of the first mass 1.

In this example the friction surface 6 is continuous and is formed on a friction member to be described below. This friction member is arranged to make contact with a carrier plate element 59 which is offset axially with respect to the main radial portion of the main flywheel 14, and lies radially inwardly with respect to the latter. The carrier plate element 59 is part of an annular nose which projects axially with respect to the main radial portion of the main flywheel 14, towards the projections 56. It constitutes a thrust plate, and as can be seen from the drawings it is in the form of an annular element which carries, integrally with it, the central hub 16, while the above mentioned nose is disposed at the inner periphery of the main radial portion of the main flywheel 14. Thus the central portion of the hollow housing of the first mass is of stepped form, with its thrust plate 59 being generally in the same plane as the damper plate 21.

As will have been understood and as is clear from the above description, the friction means 5 comprises at least one friction ring 54 which is mounted on one of the masses for rotation with the latter, here with a clearance, together with axially acting resilient means 51 for acting on the said friction ring 54 and for urging the latter into gripped contact with a friction surface 6, which is part of a friction member mounted on the other one of the said masses for rotation with the latter, optionally with a clearance.

In order to provide a unit, or unitary assembly, which is readily handled and transported, and which may conveniently be referred to as a cassette, the friction ring 54 and the friction surface 6 are carried by a support cage 60, 61, 127. This support cage includes an axial abutment element 127 on which the axially acting resilient means 51 (the Belleville ring) are engaged. This cage is force-fitted on the local portion 52, of increased radius, of the central hub 16, and is located axially by the transverse thrust plate 59 of the first mass 1, in such a way that the cage is fitted axially between this thrust plate 59 and the anti-friction bearing means 3.

In FIGS. 1 to 5, the cage is coupled in rotation to the first mass 1, with an optional circumferential clearance, while the ring 54 is coupled in rotation with a clearance (i.e. loosely coupled) with the first mass 2. The support cage, which is annular, includes a transverse plate member 60, one of the faces of which makes contact with the transverse thrust plate 59. The other face of the plate member 60 constitutes the friction surface 6 for frictional engagement with the friction ring 54. The plate member 60 is extended at its inner periphery by an axially oriented sleeve portion 61 directed towards the bearing 3.

Figure 5:
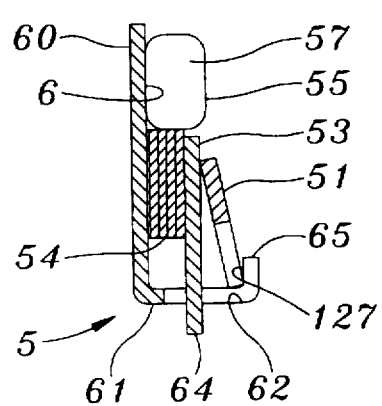
FIG. 5 is a view in axial cross section, on a larger scale than FIG. 1, showing a friction means in the double flywheel of FIG. 1.

The sleeve portion 61 surrounds the central, or inner, hub 16, and is fitted, with a fitting clearance, on the local portion 52 of the latter having an increased radius. The sleeve portion 61 is comb-shaped, being divided into fingers 65 which define between them a plurality of apertures 62. These fingers 65 are bent back radially at their free ends as is best seen in FIG. 5, so as to constitute a locating corner for the Bellevile ring 51 and so as to define the axial abutment element 127 which provides a transversely oriented shoulder for engagement with the Belleville ring 51.

The inner periphery of the Belleville ring 51 bears directly on this transversely oriented abutment element 127, while at its outer periphery it bears on the thrust ring 53 which is provided at its inner periphery, as mentioned above, with radial fingers, 64 in FIG. 5. The radial fingers 64 extend through the longitudinal aperture 62, so as to mesh with the slots, shown in FIG. 4, which are formed in the local portion 52 of the inner hub 16. The friction ring 54 is gripped between the friction surface 6 and the thrust ring 53.

Preferably, the support cage 60, 61, 127 is a metal pressing formed by blanking and drawing, with the free end of the sleeve portion 61 being finally bent back after the components 54, 53 and 51 have been fitted on to it. However, it is of course possible as an alternative to bend back the free end of the sleeve portion 61 before fitting the Belleville ring 51 into the cage by elastic deformation of its internal fingers, with the thrust ring 53 and friction ring 54 having been fitted in advance, the internal bore of the ring 54 enabling it to pass over the axial abutment element 127. However, in a further alternative the rings 53 and 54 may be fitted after formation of the abutment element 127, but before the ring 51 is fitted. A further ring may if desired be interposed between the axial abutment element 127 and the inner periphery of the Belleville ring 51, which then bears indirectly on the transversely oriented abutment element 127.

As will be understood from the foregoing, the bending of the ends of the fingers 65 enables the gripping of the friction ring 54 by the Belleville ring 51 to be closely controlled. It is the distance between the plate member 60 and the abutment element 127 that determines this grip.

Preferably, the free ends of the fingers 65 are weakened, for example by means of a recess or holes, so as to define the bending line and to provide additional control of the force exerted by the Belleville ring 51. It will also be appreciated that the thrust plate 59 does not have to be made to perfect geometry, and this simplifies the manufacture of the double flywheel and reduces its cost.

As can be seen in FIG. 1, after assembly the axial abutment element 127 bears on the locating ring 27, so that it is located axially by the latter. The support cage 60, 61, 127 is thus fitted axially between the thrust plate 59 and the bearing 3.

The fitting operation is carried out in the following way. The friction cassette 5 is first fitted over the local portion 52 of the inner hub 16, and the bearing 3 is then fitted on to the free end of the hub 16, together with the secondary flywheel (reaction plate) 20 and the damper plate 21.

It can be seen from FIG. 1 that the friction ring 54 may have the desired size without being hindered by the fastening means 24 which secure the damper plate 21 to the reaction plate 20. In the present example these fastening means 24 are in the form of studs, the heads of which are engaged in associated blind holes 25 formed in the reaction plate 20. The studs 24 extend through the base of their blind holes, and are screwed into the central tubular fastening portion of the damper plate 21 mentioned earlier herein. In a modification, the fastening means 24 may consist of rivets.

The damper plate 21 extends radially outwards from the outer hub 29, which has, projecting axially with respect to the bearing 3, an annular nose 30 which carries the projections 56 at its free end. In this way the size of the damper plate 21 can be reduced. In this example, the nose 30 has generally the same outer diameter as the thrust plate 59, and, with its projections 56, it penetrates into the casing which defines the cavity 15. This arrangement enables the flywheels described herein to be suitable for a large number of applications. In this connection, the friction ring 54 may be extended at its outer periphery 55, so as to have closed slots in the form of oblong holes into which the projections 56 penetrate with a clearance. In a modification, the friction ring 54 may have radial arms or lugs, described below, at its outer periphery 55.

Preferably (and as shown in FIG. 5), the ring 54 is thickened at its outer periphery 55 towards the outer hub 29, in such a way that the engagement surfaces between the projections 56 and the friction ring 54 are increased in area, thus reducing work hardening effects. In addition, this thickening of the friction ring 54, in cooperation with the axial nose 30 of the reaction plate, prevents the escape of grease from the cavity 15, by defining a narrow passage between the thrust plate 59 and the nose 30, this passage being arranged to be narrow enough to provide sealing for this purpose, so that the thickened portion of the friction ring acts as an internal closure element for the cavity 15.

The thrust ring 53, like the Belleville ring 51, lies radially inwardly of the thickened outer end portion 55 of the ring 54 and the axial projections 56.

The friction ring 54 is preferably made of a suitable plastics material containing particulate material such as to give it the required coefficient friction with respect to the friction surface 6, and it is reinforced by fibres such as glass fibres. The friction ring is easily made by moulding. This ring is bedded-in or lapped in advance, after the cassette has been formed but before the latter is fitted into the double flywheel.

The double damped flywheel operates in the following way.

When the vehicle starts to move, the first mass 1 is displaced circumferentially with respect to the arms 31, carrying the springs 4 with them until the insert pieces 41 come into contact with the arms 31, so that the springs 4 then become compressed so as to couple the first mass to the reaction plate 20.

During relative angular displacement of the mass 1 with respect to the mass 2, the friction means 5 are not in operation so long as the circumferential clearance between the projections 56 and the slots 57 has not been taken up.

After this clearance has been taken up, the friction ring 54 is displaced with respect to the friction surface 6 and thrust ring 53, by virtue of its meshing engagement with the projections 56.

During starting or stopping of the engine, the system passes through the resonant frequency of the double flywheel, and a substantial angular displacement takes place between the first and second masses 1 and 2, with the friction means 5 then working to damp out vibrations.

Thus, because of the angular clearance between the projections 56 and the slots 57, the friction means 5 can be made to work to good effect for a substantial angular displacement, so that when the engine is in a slow running mode, the friction means are inhibited and the vibrations that occur can be correctly damped.

It will also be appreciated, with reference to FIG. 1, that the resilient ring 51 engages generally centrally, through the thrust ring 53, on the friction ring 54, which is favourable especially from the friction point of view.

The damper plate 21 (see FIG. 6) may of course have radial projections 156, formed for example by moulding on its inner periphery, and preferably meshing with the slots 57 after a clearance has been taken up. This arrangement enables the outer hub 29 to be simplified without changing the configuration of the first mass.

Figure 7:
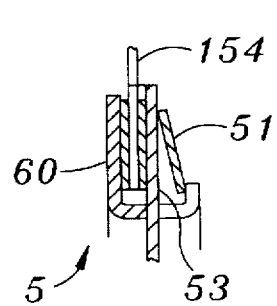

With reference to FIG. 7, the friction ring 154 may of course comprise a central metallic ring which is clad on each of its faces with a friction liner for contact with the friction surface 6 and with the thrust ring 53, respectively. It is the central ring which meshes, through slots with which it is formed at its outer periphery, with the tooth-shaped radial projections 156.

Figure 6:
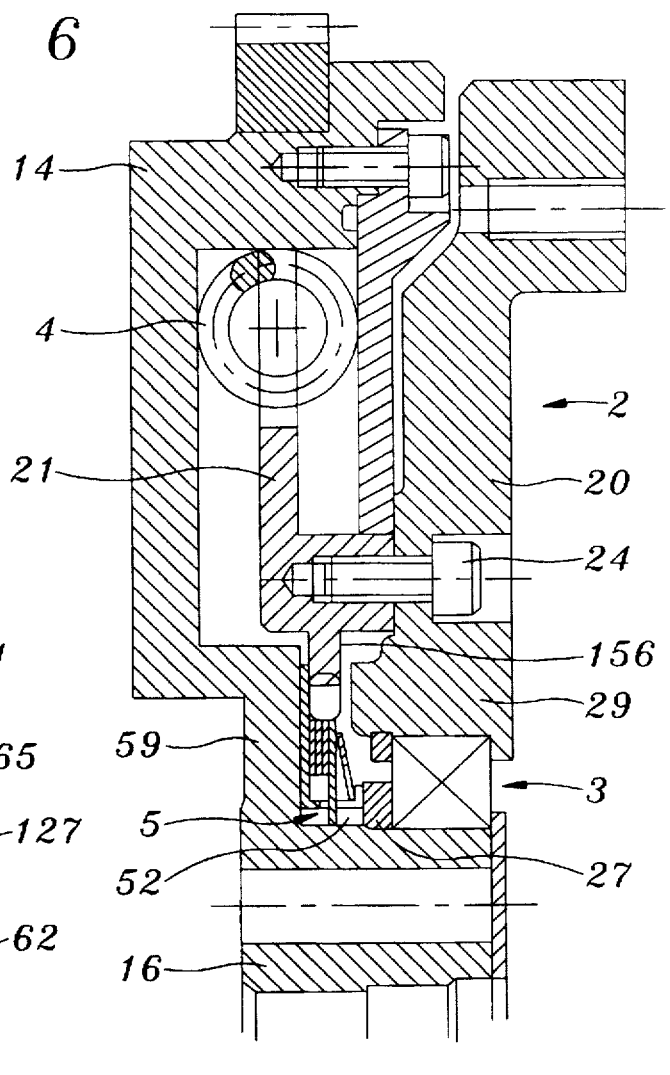
FIG. 6 is a view similar to FIG. 1, showing a second embodiment of the invention.
Figure 8:
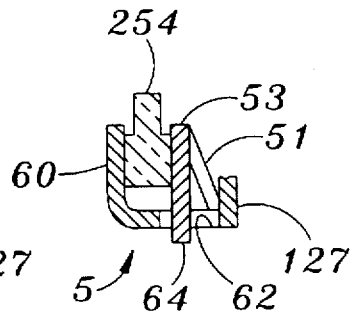

It is possible to reverse the structures of FIG. 6. Thus, and as shown in FIGS. 8, 16 and 17, the friction ring 254 has at its outer periphery central radial lugs 157 of reduced thickness, which penetrate with a clearance into slots 256 which are wider and which are formed at the inner periphery of the damper plate 21, for loose meshing, and thus coupling in rotation, with a circumferential clearance, to the damper plate.

Figure 16:
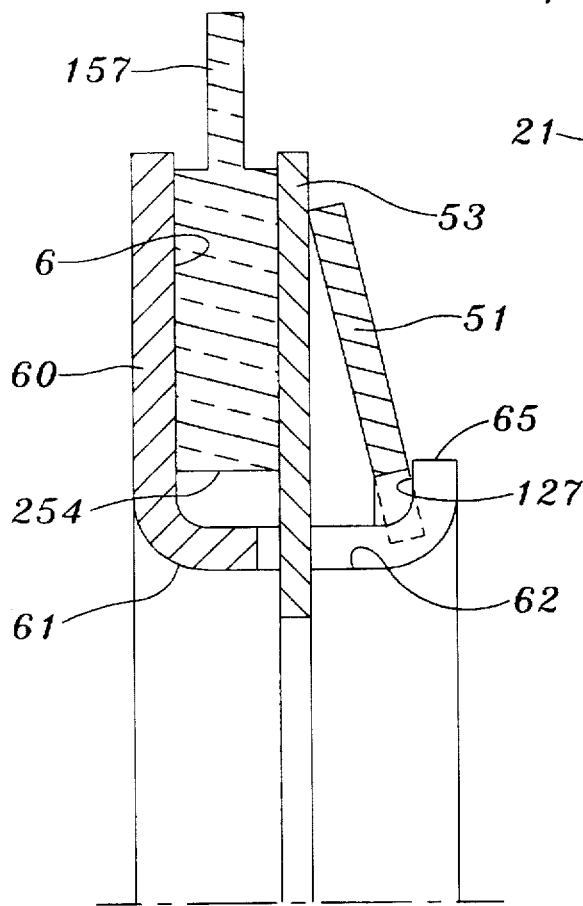
FIG. 16 repeats FIG. 8 but on a much larger scale.
Figure 17:
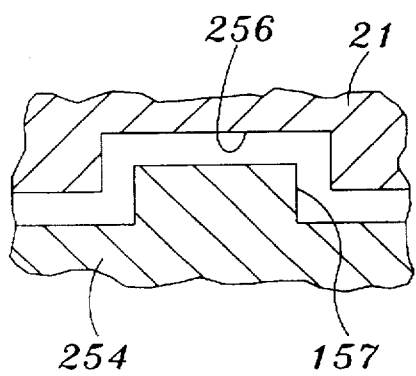
FIG. 17 is a view of the rotational coupling means which work between the friction means and the damper plate in FIG. 6.

With reference to FIG. 16, the resilient means 51 are here mounted in rotation on the sleeve portion 61. This arrangement may be adopted in all of the embodiments shown in the drawings. In this connection, the Belleville ring 51 has at its inner periphery a set of radial fingers which mesh with the apertures 62. In a modification, two consecutive fingers may be slotted for meshing with the fingers 65.

Figure 9:
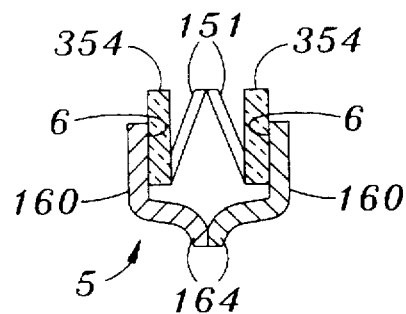
FIGS. 7 to 15 are views similar to FIG. 5, each illustrating a modified embodiment of the friction means.

The annular support cage of the friction cassette may be in two parts 160 as shown in FIG. 9, the two parts being joined together at their inner periphery, for example by adhesive bonding or welding of radial lugs 164, which mesh (optionally with a circumferential clearance) with the slots in the local portion 52 of the inner hub 16. In this case, the support cage has two friction surfaces 6, while two friction rings 354 of constant thickness are provided for frictional contact of each of these rings with the corresponding portion 160 of the support cage, each friction ring 354 having, for example, at its outer periphery a set of teeth for meshing with the slots 256 seen in FIG. 17.

These two parts 160 may be of metal, or possibly of a suitable fibre reinforced synthetic material. In FIG. 9, there are two Belleville rings 151, engaging with each other at their outer periphery and interposed between the two friction rings 354. At their outer periphery, the Belleville rings 151 bear on the friction rings 354. The Belleville rings 151 thus engage at their inner periphery on the friction rings, and at their outer periphery indirectly on the other part 160 of the cage, which then defines the axial abutment element of the friction cassette.

Figure 10:
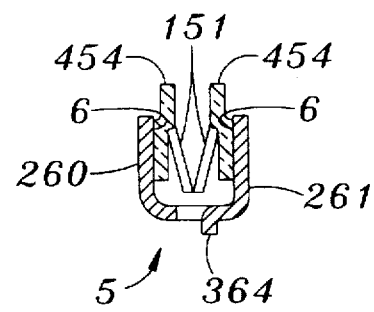

In the arrangement shown in FIG. 10, the support cage of the friction cassette, which is a metal pressing, is a single component and has a hollow annular shape. It has a U-shaped cross section, the base of which defines radial fingers 364 formed in slots for meshing with slots formed in the local portion 52 of the inner hub 16. In this case, the support cage has two friction surfaces 6, and the friction rings 454 mesh, through fingers or lugs as in FIG. 17, with slots which are formed in a component fixed with respect to the second mass 2 of the double flywheel.

These friction rings 54 are slotted so as to define centring shoulders for the Belleville rings 151, which are fitted in the opposite configuration from that shown in FIG. 9. In a modification, the lugs or the teeth 364 may be formed integrally by moulding with the support cage 260, 261.

The present invention is of course not limited to the various embodiments already described above. In particular, the friction ring 54 may mesh without any clearance with the projections 56 or 156, or with the slots 256.

Figure 11:
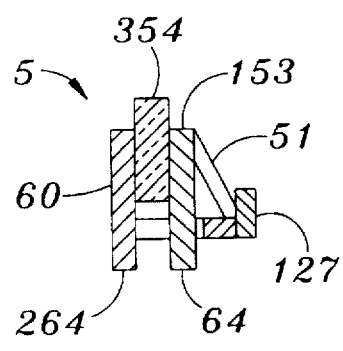

In the modification shown in FIG. 11, the support cage has teeth or radial lugs 264 at its inner periphery for meshing (optionally with a circumferential clearance) with slots formed in the local portion 52 of the inner hub 16. The support cage is thus coupled directly in rotation to the inner hub, and indirectly through the ring 153.

Figure 12:
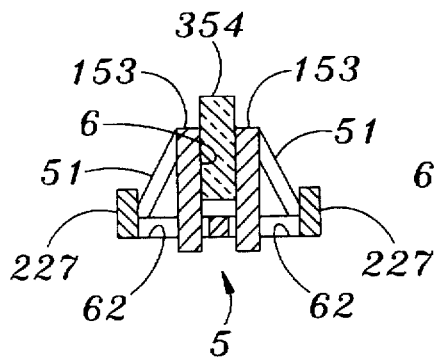

In the arrangement shown in FIG. 12, the support cage is in the form of a sleeve having radially oriented flanges 227 at its two ends. These flanges 227, which are formed by transverse bending like the abutment elements (or flanges) 127 in FIG. 5, serve as an axial abutment element for the inner periphery of a Belleville ring 51, the outer periphery of which bears on a thrust ring 153 in FIG. 12. Thus the friction ring 354 is gripped between two thrust rings 153, to define a reaction element extending through slots 62 which are formed in the cage, so that these thrust rings 153 can mesh, again with an optional circumferential clearance, with the local portion 52 of the inner hub 16 in the same way as described above. In this case, thne friction member which carries the friction surface 6 consists of one of the thrust rings 153.

Figure 13:
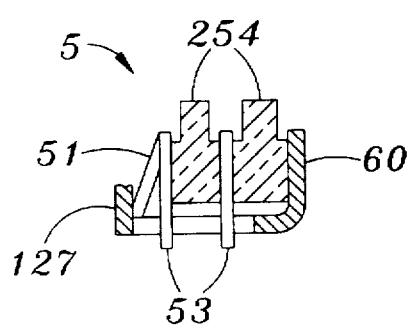
Figure 14:
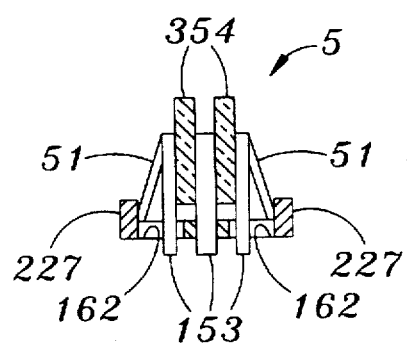
Figure 15:
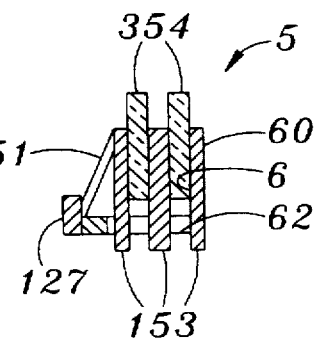

With reference to FIGS. 13 to 15, in these versions the number of friction rings, 254 or 354, is doubled, the number of thrust rings 53, 153 being then either two or three. In these Figures, the friction surface is defined on one of the thrust rings, and in practice a plurality of friction surfaces are provided.

It will be noted that in FIGS. 13 and 15, the friction cassette 5 is orientated in the opposite way from the cassettes in FIGS. 11 and 8, with the plate members 60 being adjacent to the bearings 3, while the abutment elements 127 are adjacent to the thrust plate (59, FIG. 1).

In every case, it is possible to reverse the orientation of the cassette in such a way that the same friction cassette can be used for several torsion damping devices, subject to the position of the thrust plate 59.

Figure 18:
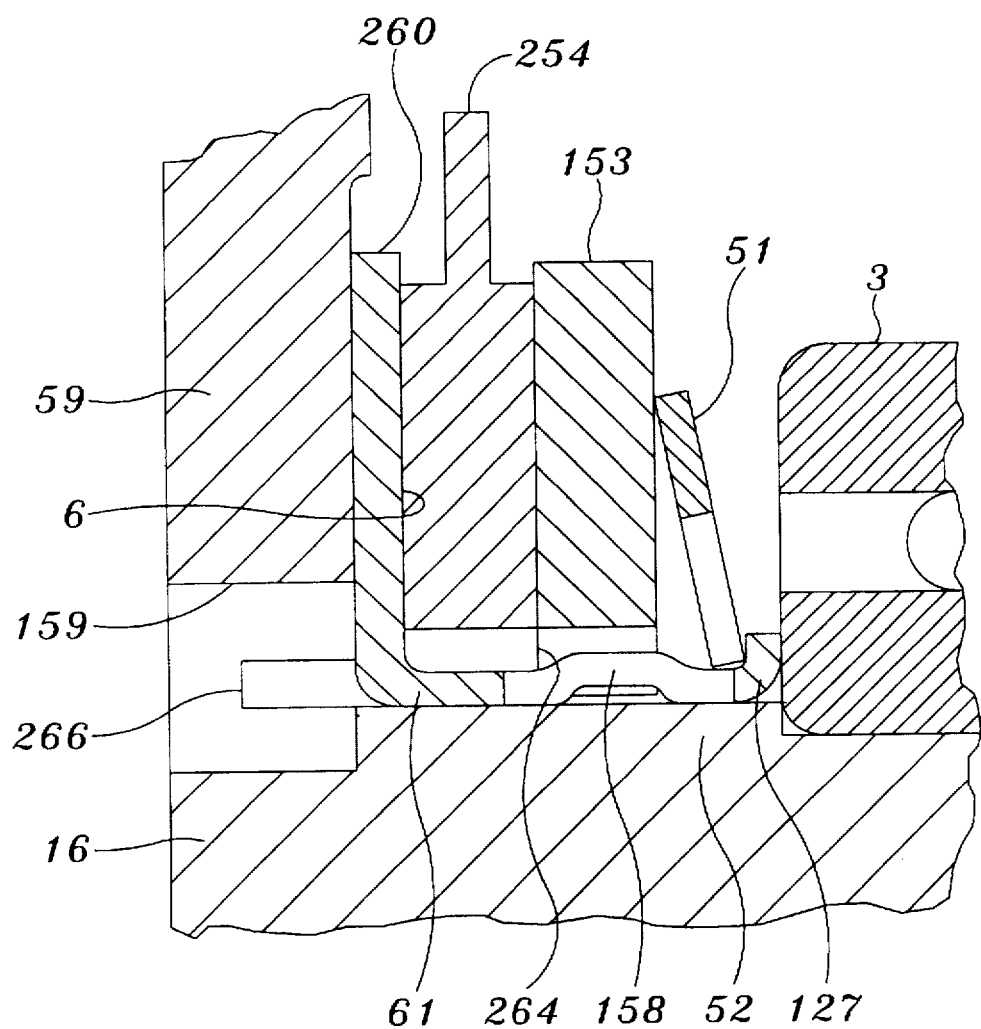
FIG. 18 is a view similar to FIG. 5, showing the friction means after having been fitted in the torsion damping device, in yet another embodiment of the invention.

FIG. 18 shows an arrangement in which the support cage is force-fitted directly on to the local portion 52 of the inner hub 16, there being in this case no teeth formed on the hub. In this particular example, the support cage 260 which has the friction surface 6, for engagement by the friction ring 254, has a transverse flange formed with a sleeve portion 61 at its inner periphery. This sleeve portion has local longitudinal deformations (ribs) 158, which mesh with slots 264 (optionally with a circumferential clearance), these slots 264 being formed in the inner periphery of the thrust ring 153. The ribs 158 project radially outwards from the sleeve portion 61. In this case, the rolling bearing 3 is force-fitted on the inner hub 16 so as to abut against the local portion 52 of the latter, which does not have any teeth.

It will of course be realised that in the event of force-fitting not being sufficient to provide the required coupling in rotation between the friction cassette 5 and the first mass 1 of the double flywheel, axial lugs 261, shown in FIG. 18, which extend the sleeve portion 61 backwards, can be provided for engagement in apertures 159 formed in the thrust plate 59.

When the axial abutment element 127 is discontinuous, it is possible to fit the rings 254, 153 and 151 after the abutment element 127 has been formed by bending, with the Belleville ring 51 being forced elastically over the abutment element 127 by deformation of its fingers. The inclined bores of the ring 54 and of the slots 264 are deeper than the abutment element 127. In this case, the support cage may if desired be made of a suitable plastics material.

In every case of course, the abutment element 127 or 227 may or may not make contact with the locating ring 27 or the bearing 3.

The support cage is not necessarily of annular shape. For example, its inner periphery may be formed with flats for force-fitting on to the central hub, which then has complementary flats.

In a further modification, the central hub and the inner periphery of the friction cassette may be of polygonal form. However, in all cases the friction cassette surrounds the central hub.

The thrust plate 59 may, instead of being axially offset from the main radial portion of the main flywheel 14, be coplanar with it, so that the main flywheel consists of a simple annular plate element carrying the flange 10 and the central hub 16. It should be noted that the central hub 16 may be a separate component secured on the main flywheel 14.

What is claimed is:

1. A damped double flywheel comprising: a first mass having a central hub; a second mass comprising a plate member and an outer hub carried by said plate member internally of the plate member and surrounding part of the central hub; anti-friction bearing means disposed between said central and outer hubs mounting said second mass on said first mass; and a circumferentially acting torsion damper operatively disposed between said masses and coupling said first mass to the plate member of the second mass, the torsion damper comprising a friction means for generating friction between said masses, the friction means comprising; at least one friction ring mounted on the first mass for rotation with the mass; axially acting resilient means resiliently engaging said friction ring; and a friction member mounted on said first mass for rotation with the first mass and defining a friction surface, the friction ring being mounted between said axially acting resilient means and said friction surface whereby to be urged by the friction ring into contact with the friction surface, wherein the friction means constitutes a cassette forming a modular assembly that is transportable as a unit, and comprising a support cage constituted with said friction member with its friction surface, the support cage carrying said friction ring and defining an axial abutment element for engagement by said axially acting resilient means, the central hub having a portion of increased radius, said support cage being fitted on said portion, said first mass including a transverse thrust plate, said portion of the central hub being offset axially from said bearing means, and said bearing means and thrust plate together locating the support cage axially therebetween, and wherein the support cage comprises a transverse plate member having an inner periphery and an axially oriented sleeve portion extending the plate member at said inner periphery, said sleeve portion having a free end bent back transversely so as to define said axial abutment element.

2. A double flywheel according to claim 1, wherein the support cage comprises a transverse plate member having an inner periphery and an axially oriented sleeve portion extending the plate member at its said inner periphery, said sleeve portion having a free end bent back transversely so as to define said axial abutment element.

3. A double flywheel according to claim 1, wherein said sleeve portion is comb-shaped, defining a plurality of fingers and apertures between the fingers, said fingers being bent back transversely at their free ends so as to define a locating corner, said axially acting resilient means being engaged in said locating corner.

4. A double flywheel according to claim 3, wherein the friction means further include a thrust ring interposed between the axially acting resilient means and the friction ring, the thrust ring having radial fingers extending through said apertures in the sleeve portion of the support cage.

5. A double flywheel according to claim 1, wherein the sleeve portion defines longitudinal localized deformations, the friction means further including a thrust ring interposed between the said axially acting resilient means and the friction ring, the thrust ring having an inner periphery defining slots meshing with said localized deformations of the sleeve portion.

6. A damped double flywheel comprising: a first mass having a central hub: a second mass comprising a plate member and an outer hub carried by said plate member internally of the plate member and surrounding part of the central hub; anti-friction bearing means disposed between said central and outer hubs mounting said second mass on said first mass; and a circumferentially acting torsion damper operatively disposed between said masses and coupling said first mass to the plate member of the second mass, the torsion damper comprising a friction means for generating friction between said masses, the friction means comprising; at least one friction ring mounted on the first mass for rotation with the first mass; axially acting resilient means resiliently engaging said friction ring; and a friction member mounted on said first mass for rotation with the first mass and defining a friction surface, the friction ring being mounted between said axially acting resilient means and said friction surface whereby to be urged by the friction ring into contact with the friction surface, wherein the friction means constitutes a cassette forming a modular assembly that is transportable as a unit, and comprising a support cage constituted with said friction member with its friction surface, the support cage carrying said friction ring and defining an axial abutment element for engagement by said axially acting resilient means, the central hub having a portion of increased radius, said support cage being fitted on said portion, said first mass including a transverse thrust plater said portion of the central hub being offset axially from said bearing means, and said bearing means and thrust plate together locating the support cage axially therebetween.

wherein the support cage is mounted directly on the first mass for rotation therewith, and wherein said portion of the central hub has meshing means, the support cage having radial fingers at its inner periphery meshing with said meshing means of the central hub for rotation therewith.

\* \* \* \* \*